US008299896B2

(12) United States Patent
Mahmoodi et al.

(10) Patent No.: US 8,299,896 B2
(45) Date of Patent: Oct. 30, 2012

(54) HAND HYGIENE DELIVERY SYSTEM

(75) Inventors: Abolghassem B. Mahmoodi, St. Paul, MN (US); Chung Tsing Liu, Bloomington, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 822 days.

(21) Appl. No.: 12/300,253

(22) PCT Filed: May 8, 2007

(86) PCT No.: PCT/US2007/068201

§ 371 (c)(1),
(2), (4) Date: May 26, 2009

(87) PCT Pub. No.: WO2007/133960

PCT Pub. Date: Nov. 22, 2007

(65) Prior Publication Data

US 2009/0295539 A1 Dec. 3, 2009

Related U.S. Application Data

(60) Provisional application No. 60/747,047, filed on May 11, 2006.

(51) Int. Cl.
*G06F 7/04* (2006.01)

(52) U.S. Cl. ...................................... 340/5.83; 340/5.82

(58) Field of Classification Search ........ 340/10.1–10.6, 340/5.82, 5.83, 573.1
See application file for complete search history.

(56) References Cited

U.S. PATENT DOCUMENTS

| | | | | |
|---|---|---|---|---|
| 6,898,299 | B1 * | 5/2005 | Brooks | 382/115 |
| 2002/0019709 | A1 | 2/2002 | Segal | |
| 2004/0090333 | A1 | 5/2004 | Wildman et al. | |
| 2005/0249386 | A1 * | 11/2005 | Juh | 382/124 |
| 2006/0231568 | A1 * | 10/2006 | Lynn et al. | 222/52 |

FOREIGN PATENT DOCUMENTS

| | | | |
|---|---|---|---|
| EP | 0848114 | A | 6/1998 |
| FR | 2872315 | A | 12/2005 |

* cited by examiner

*Primary Examiner* — Brian Zimmerman
*Assistant Examiner* — Yong Hang Jiang
(74) *Attorney, Agent, or Firm* — David B. Patchett

(57) ABSTRACT

Hand hygiene apparatuses and methods for monitoring hand hygiene and for dispensing hand soap or hand sanitizers. An illustrative hand hygiene apparatus includes a computer, a database stored on the computer, a biometric sensor operatively coupled to the computer, a hand hygiene dispenser operatively coupled to the computer, and a hand soap or hand sanitizer disposed adjacent to the hand hygiene dispenser. The database might include a collection of partial biometric data for a group of persons. An illustrative method may include collecting a set of partial biometric data, providing a biometric sensing apparatus and a hand hygiene dispenser coupled to the biometric sensing apparatus, sensing biometric data from a first individual from the group of persons with the biometric sensing apparatus, identifying the first individual by comparing the sensed biometric data with the set of partial biometric data, and dispensing a hand soap or hand sanitizer from the hand hygiene dispenser onto the hands of the first individual.

6 Claims, 3 Drawing Sheets

HAND HYGIENE DELIVERY SYSTEM

CROSS REFERENCE TO RELATED APPLICATIONS

This application is a national stage filing under 35 U.S.C. 371 of PCT/US2007/068201filed 8 May 2007, which claims priority to U.S. Provisional Application No. 60/747,047, filed 11 May 2006, the disclosures of which are incorporated by reference in their entirety herein.

BACKGROUND

The present disclosure relates generally to hand hygiene delivery systems and/or to methods for monitoring hand hygiene and for dispensing hand soap or hand sanitizers.

Every parent has recited the phrase "wash your hands" numerous times in order to impress the importance of this seemingly simple task to children. While the importance of personal hand hygiene at home should not be discounted, in an industrial, commercial, clinical, laboratory, manufacturing, etc. setting, proper maintenance of and/or compliance with hand hygiene standards can be the difference between success and failure.

A number of hand hygiene systems and methods have been developed for various industries including, for example, food safety, retail food sales/preparation, hospitals, schools, pharmaceutical production, etc. The goal of such systems, generally, is to provide a reliable way for persons using the system to clean their hands according to guidance standards, record the hand cleaning, and to create reports that demonstrate compliance with the standards. Each system has certain advantages and disadvantages. There is an ongoing need to provide new hand hygiene systems, methods for monitoring hand hygiene, and methods for dispensing hand soap or hand sanitizers.

SUMMARY

The present disclosure relates generally to hand hygiene delivery systems and/or to methods for monitoring hand hygiene and for dispensing hand soap or hand sanitizers.

In one embodiment, a method for monitoring hand hygiene and for dispensing hand soap or hand sanitizers is described. The method includes the steps of collecting a set of partial biometric data from a group of persons, providing a biometric sensing apparatus and a hand hygiene dispenser coupled to the biometric sensing apparatus, sensing biometric data from a first individual from the group of persons with the biometric sensing apparatus, identifying the first individual by comparing the sensed biometric data from the first individual with the set of partial biometric data, and dispensing a hand sanitizer from the hand hygiene dispenser onto the hands of the first individual.

In another embodiment a hand hygiene apparatus is described. The apparatus includes a computer, a database stored on the computer having a collection of partial biometric data for a group of persons, a biometric sensor operatively coupled to the computer, a hand hygiene dispenser operatively coupled to the computer, and a hand soap or hand sanitizer disposed adjacent to the hand hygiene dispenser. An algorithm may be stored on the computer that controls the dispensing of the sanitizer from the dispenser when the biometric sensor senses biometric data matching the partial biometric data of an individual from the group of persons.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
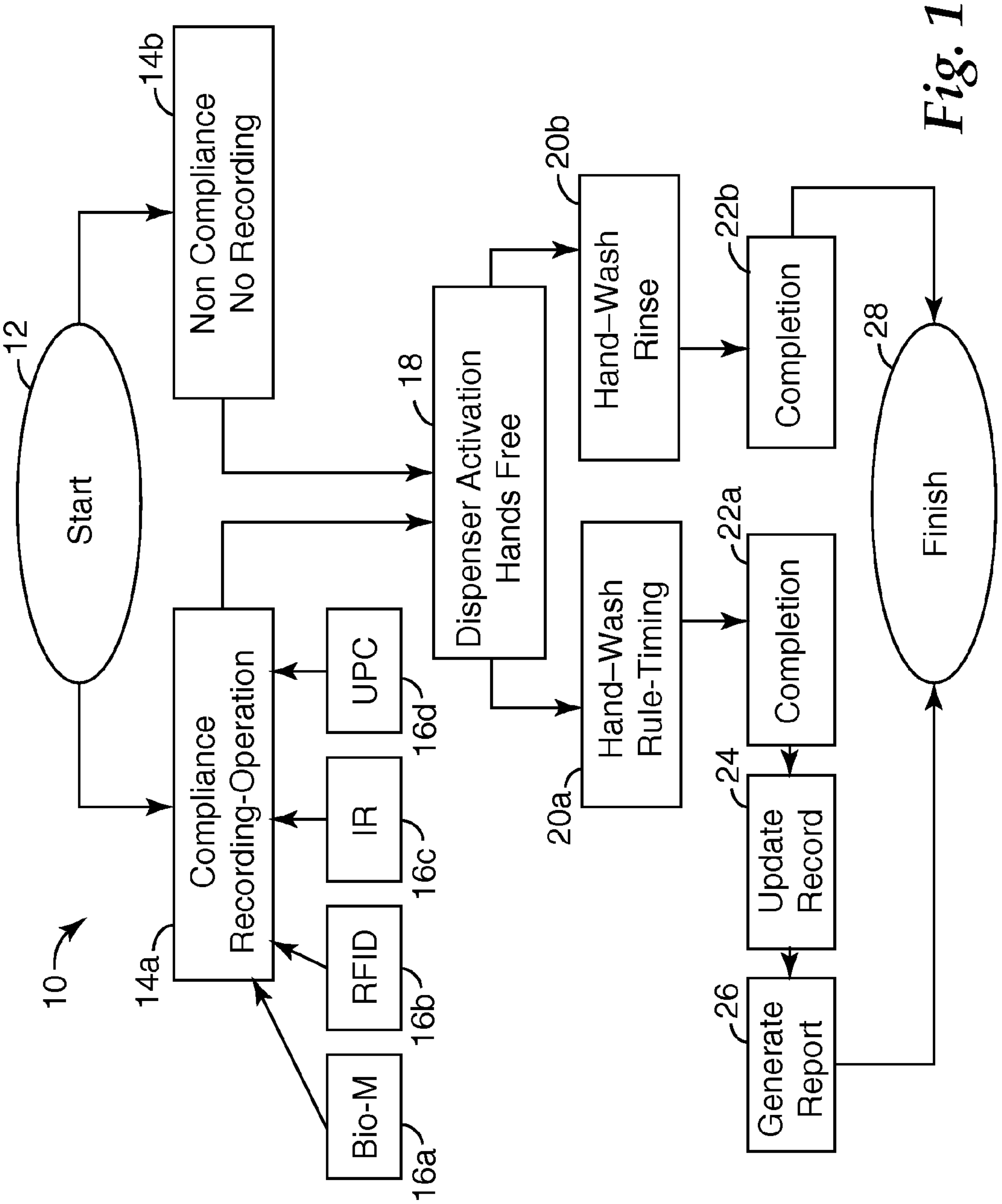
FIG. 1 is a block diagram of an example hand hygiene delivery system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The methods and apparatuses described herein are believed to be applicable to hand hygiene delivery systems and methods for monitoring hand hygiene and/or for dispensing hand soap or hand sanitizers. While the present invention is not so limited, an appreciation of various aspects of the invention will be gained through discussion of the various features and components provided below.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

As indicated above, a number of hand hygiene systems and methods have been developed for various industries. These systems typically incorporate an identification system (such as a radiofrequency identification tag) for identifying a user so that the user's participation in the hand hygiene protocol can be noted, logged, and recorded. One limitation of these systems is that the system does not ensure that the individual using the system is, in fact, the individual on the tag. This is because user tags can become misplaced or otherwise associated with the wrong individual. Other elaborate systems utilize complex biometric analysis that utilize a full biometric data scan of the individual. While these systems overcome some of the limitations of tag-based systems, the complex biometric analysis requires highly powerful scanners and/or computer systems in order to complete a scan cycle. Consequently, these systems can be costly and may require extended periods of time in order for a cycle to be carried out.

In at least some embodiments, the systems and methods described herein are designed to address and/or overcome at least some of the limitations associated with other systems. For example, FIG. 1 is a block diagram schematically depicting a method that can be carried out by an illustrative embodiment of a hand hygiene delivery system 10. In general terms, system 10 utilizes one or more sensors to collect and/or sense data from a group of persons and to dispense a hand sanitizer to an individual from the group or, in some embodiments, to individuals outside the group. The beginning or "start" of system 10 is shown at block 12. From block 12, system 10 follows one of two paths. The first path is for "compliant" users and is represented by block 14*a*. The second path is for "non-compliant" users and is represented by block 14*b*. The main distinction between the "compliant" and "non-compliant" paths relates to the sensing of data from a user. In general, data is collected from a defined group of individuals in a manner sufficient to distinguish persons from the defined group. System 10 includes one or more sensors capable of sensing the same type of data collected from the individuals and if the data collected "matches" the collected data, system 10 follows the compliant path. Users who do not match the collected data or that do not utilize the sensor or sensors associated with block 14*a* follow the non-compliant path. The non-compliant path may also be termed the manual pathway, the non-recorded pathway, the override pathway, etc.

Blocks 16*a*/16*b*/16*c*/16*d* represent some of the sensors contemplated for sensing data from individuals. For example, block 16*a* represents that some of the sensors may include biometric sensors that are designed to sense biometric data from individuals. A number of different types of biometric sensors are contemplated and at least some of the contemplated sensors are described in more detail below. Numerous other sensors may be used instead of biometric sensors or in addition to biometric sensors. For example, block 16*b* represents that a radiofrequency identification sensor may be utilized. Some of the other sensors contemplated include an infrared sensor as represented by block 16*c*, a universal product code (i.e., a UPC or "bar" code) sensor as represented by block 16*d*, and the like, or any other suitable sensor.

From either the compliant or the non-compliant pathway, blocks 14*a*/14*b* of system 10 both lead to the activation of the hand hygiene dispenser to dispense the hand soap or hand sanitizer to the hands of the individual as represented by block 18. This may include numerous structures associated with system 10 as well as a number of sensors. For example, system 10 may include a suitable washing station including, for example, a hand sanitizer, a dispenser and/or vessel for the hand sanitizer, a water source (which is optional depending on the particular system utilized as several systems are contemplated that utilize "waterless" hand sanitizers), a sensor for determining that the hands of a user are properly positioned relative to the dispenser (e.g., an infrared sensor), a drain, a timer, etc. Some of these as well as other structures are described in more detail below.

Depending on whether the compliant or the non-compliant path is followed, block 18 leads to either block 20*a* or to block 20*b*. As represented by block 20*a*, the compliant path may include hand washing that might occur according to one or more rules and over a set or variable amount of time. For example, a particular industry may have set protocols for the timing and/or type of hand washing required and the rules may allow each individual to comply with these rules or standards. To accommodate one or more timing cycles or steps, a suitable timer may be incorporated into system 10. The timer may time and/or control (e.g., determine a beginning and an ending) any number of functions. For example, the timer may control functions such as amount of time that hand soap or hand sanitizer is dispensed from the hand hygiene dispenser (which, consequently, may also control the quantity of hand soap or hand sanitizer dispensed), the amount of time after the hand hygiene dispenser is activated until water begins dispensing from the water station, the amount of time that water is dispensed from the water station, the amount of time that a users hands are in the vicinity of the hand hygiene dispenser and/or water station (e.g., for recording and/or compliance purposes), the amount of time that a user has to complete hand washing before being removed from the compliant path and being moved to the non-compliant path, combinations of any of these timing steps, and the like. If the timer is used to record the amount of time that a users hands are in the vicinity of the hand hygiene dispenser and/or water station, for example, system 10 may record compliance when the amount of time meets or exceeds a pre-set standard. For example, if a user has their hands in the vicinity of the water station for 35 seconds, the user will be deemed compliant (and recorded as such) if the time required to meet a particular standard is less than or equal to 35 seconds.

After hand washing, the method reaches completion of hand washing as represented by block 22*a*. Following completion, the method may also includes recording or updating the record of hand sanitization as represented by block 24, generating a report of hand sanitization as represented by block 26, and finally the finish of the method as represented by block 28. Completion of hand washing along the non-compliant path is represented by block 22*b* and lead to the finish of the method (i.e., as represented by block 28).

Figure 2:
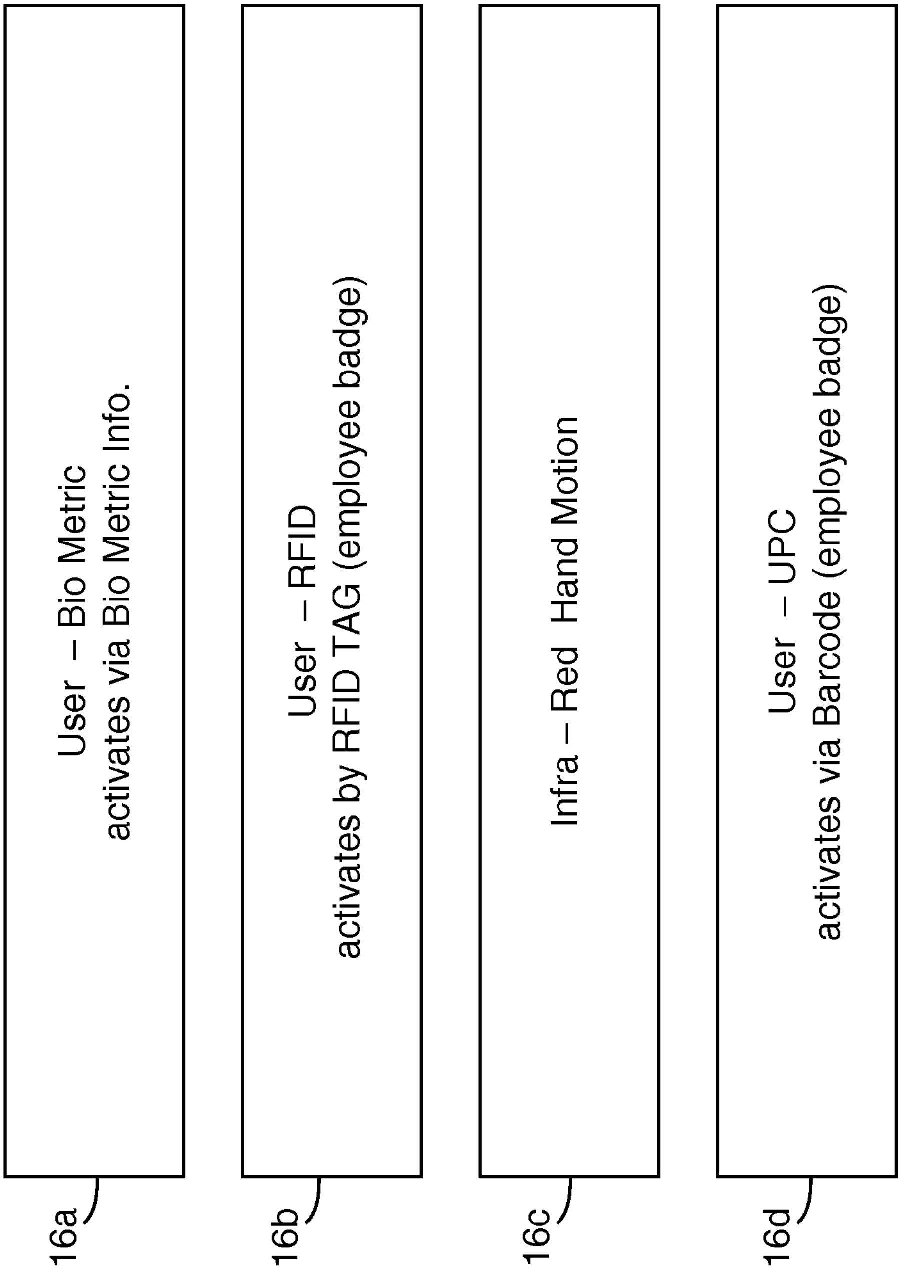
FIG. 2 is a block diagram of some example sensors for use with a hand hygiene delivery system.

Turning now to FIG. 2, which is a block diagram showing blocks 16*a*/16*b*/16*c*/16*d*, some additional details of some of the various sensors that may be utilized for system 10 can described. It should be noted that these sensors are not intended to be only usable for determining whether or not an individual using the system is compliant or not as these or similar scanner may be utilized as being part of other components of system 10 or in conjunction with other steps of the method. For example, one or more of the sensors may be a "two-part" sensor that both identifies the user and controls the dispensing of hand soap or hand sanitizer. In addition, a wide variety of alternative sensors and/or scanners may also be used including ear image sensors/scanners, face image sensors/scanners, voice sensors/scanners, signature (hand writing) sensors/scanners, hand geometry sensors/scanners, finger profile sensor/scanners, eye (e.g., iris, retina, etc.) sensors/scanners, hand temperature/thermogram sensors/scanners, face temperature/thermogram sensors/scanners, DNA sensors/scanners, and the like, combinations thereof, or any other suitable sensors/scanners.

Block 16*c* illustrates that an infrared sensor may be utilized. In some embodiments, the infrared sensor detects hand motion relative to a dispenser and/or water source. Once the sensor detects the appropriate motion, the appropriate reaction is triggered such as, for example, the dispensing of hand sanitizer and/or water. Block 16*b* illustrates that a radiofrequency identification tag sensor may be utilized. In some embodiments, a user is equipped with an identification tag or badge, or have a radiofrequency identification element implanted within the user's body. The tag produces the appropriate radiofrequency signal that can be detected by the scanner in order to trigger action such as the method entering the compliance path and/or the activation of a hand hygiene sanitizer dispenser. Numerous tag types are contemplated including hook and loop badges. Block 16*d* illustrates that a UPC code sensor may be utilized. Much like with the radiofrequency tag system, a user may have a UPC code that can be readable by the sensor in order to similarly trigger action.

Block 16*a* illustrates that an example biometric sensor or sensing apparatus. The biometric sensor may take any one of a number of different forms. For example, the biometric sensor may take the form of a fingerprint sensor/scanner. Alternatively, the biometric sensor may be any of the sensors listed above such as a hand geometry sensors, finger profile sensors, etc.

As indicated above, some biometric sensors utilize a very high level of scanning so that essentially every person in the world can be distinguished using the sensor. For example, crime scene investigators may use a fingerprint scanner that collects twelve or more fingerprint characteristic points (i.e., minutiae such as ridge endings and/or ridge bifurcations). While these "full" biometric scans are useful for a number of applications it may be more than what is required for systems such as system 10. For example, fingerprint scanners useful for system 10 may only need to scan a partial biometric scan. This may include, for example, seven or less fingerprint characteristic points, six or less fingerprint characteristic points, five or less fingerprint characteristic points, etc. Not only does this allow for less expensive equipment to be used with system 10, scans can also be completed in a fraction of time because less scanning is required and the comparison between the scan and the database is also simplified.

The differences between the scan resolution or level for crime lab quality fingerprint scans versus the fingerprint scans of system 10 lie in that system 10 only needs to be able to distinguish between the each individual within a defined group of persons using system 10. Generally, this level of scan is substantially insufficient to distinguish a pool of persons outside the defined group using the scanner. Put another way, the sensors/scanners used for system 10 only need to be able to tell the difference between the people using system 10. Systems that would be able to extend beyond this point would add unnecessary cost to the system and defeat the elegant simplicity of system 10. In addition, because a lesser quantity of biometric data is collected, the privacy of each user can be respected without the need of invasive full biometric scans of various personal attributes.

Figure 3:
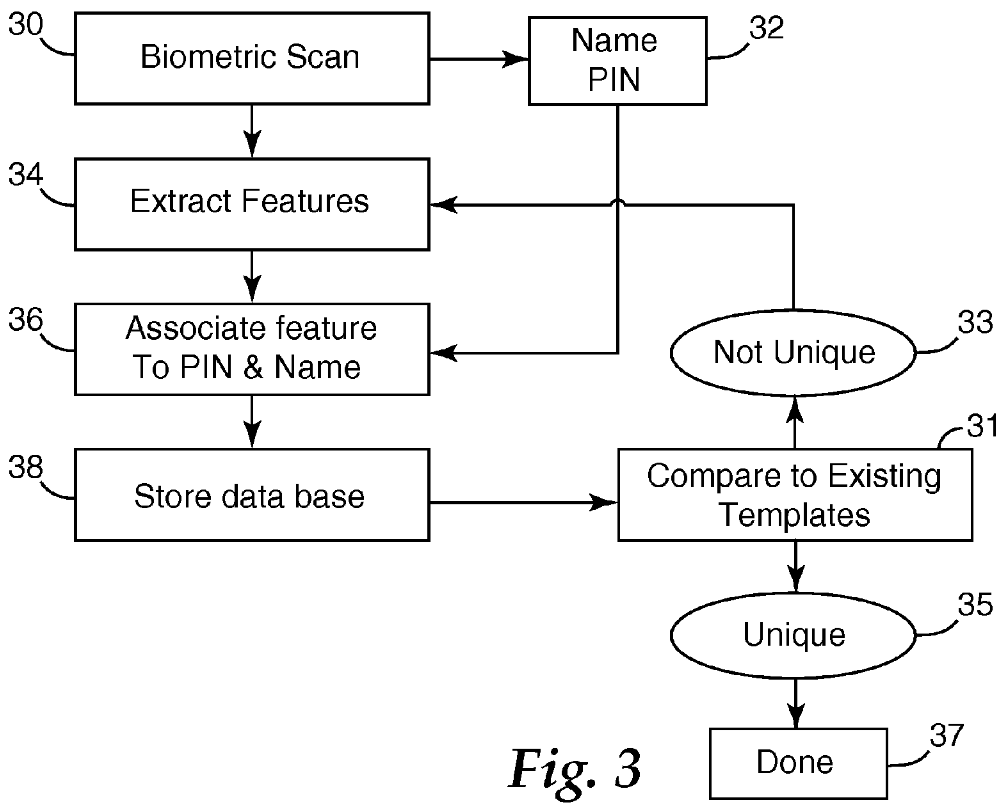
FIG. 3 is a block diagram showing an illustrative method for collecting a set of partial biometric data.

Thus, the design of system 10 will generally include the collecting of a set of partial biometric data from a group of persons using the system as shown in FIG. 3. This may include, for example, conducting a biometric scan (e.g., recording a template of a fingerprint) as shown in block 30. The scan is associated with an individual from the defined group as indicated at block 32. In general, the biometric scan is a partial biometric scan that, for example, collects fingerprint data (e.g., minutiae) from the individuals such as seven, six, five, or so fingerprint characteristic points (i.e., minutiae), depending on the size and/or makeup of the group. This "extraction" or collecting step is indicated by block 34. In general, the collecting step is carried out until the set of partial biometric data is sufficient to distinguish each individual within the group. Thus, each stored template is compared to the existing templates at block 31 and if unique (block 35), then the template is stored and the user is "registered". If the template is not unique (block 33), then additional minutiae is extracted at block 34 and then compared at block 31 to determine if the template is unique. This process is repeated in a progressive manner until the template is determined unique and the user is then "registered".

It is likely that this partial biometric data is substantially insufficient to distinguish a pool of people outside of the group of persons. With the data collected, the names or personal identification number of each individual can be associated with the individual's features as shown in block 36 and that data can be stored in a database as indicated by block 38.

Figure 4:
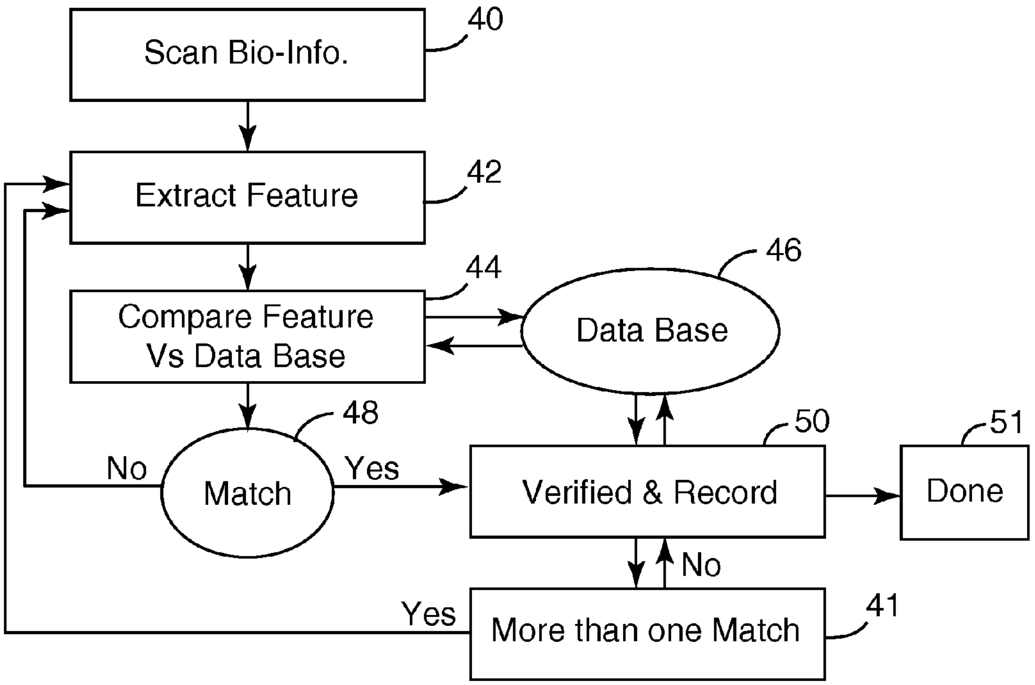
FIG. 4 is a block diagram showing the use of a set of partial biometric data with a hand hygiene delivery system.

After this "registration" stage, hand hygiene delivery methods can be carried out as shown in FIG. 4. The method may include the sensing of biometric data from an individual as indicated by block 40 with a biometric sensing apparatus (e.g., a fingerprint scanner) to extract a biometric feature as indicated by block 42. With the biometric data sensed, the biometric feature, indicated by block 44, can be compared with the database (e.g., the database shown at block 38 of FIG. 3) of the partial biometric data as shown at block 46. The system 10 then attempts to identify or "match" the individual by comparing the sensed biometric data from the individual with the set of partial biometric data stored in the database. Matching algorithms and associated software are known in the art and are also known as 1:N verification. With this method, N impressions or templates of fingerprints are enrolled or registered and the question is whether or not an input impression or template belongs to the ensemble of the enrolled or registered templates. The verification accuracy rate for 1:N verification is higher than a 1:1 verification accuracy rate when utilizing the same number of minutiae. This 1:N matching, which is shown at block 48, either results in a failure to match or a verification of at least one user. If a failure to match occurs, the scan/extraction (e.g., at block 42) can be repeated for a fixed or infinite number of cycles. If a fixed number of cycles is utilized, a certain number of scan failures will cause system 10 to enter the non-compliance path (e.g., at block 14*b* as shown in FIG. 1). System 10 may also include a switch that allows an individual to enter the non-compliant path with the need for repeated scans.

If a single match is achieved, system 10 progresses through the compliance pathway and, ultimately, results in both hand cleaning, verification, and recording. The recording step is shown at block 50 and is essentially the same as any or all of blocks 22*a*, 24, and 26 of FIG. 1. However, if more than one match is achieved (block 41), then additional minutiae is extracted at block 42 and then compared at block 48 to determine if the template is a match at block 48 and then at block 41 to determine if the template is unique. This progressive extraction and comparison allows for a minimum number of minutiae to be utilized in verifying each user of a defined group or pool of registered users.

It can be readily appreciated that in order to carry out the above method, a hand hygiene apparatus or system (e.g., system 10) will be used. The exact configuration or components of system 10 can vary. For example, system 10 may include a computer (including, for example, memory, a microprocessor and I/O elements), a database stored on the computer, a biometric sensor operatively coupled to the computer, a hand hygiene dispenser operatively coupled to the computer, and a sanitizer disposed adjacent to the hand hygiene dispenser. The database is essentially the same in form as the database collected at box 38 of FIG. 3 and includes a collection of partial biometric data for a group of persons that is sufficient to distinguish each individual within the group of persons but being substantially insufficient to distinguish a pool of people outside of the group of persons. In order to control the various method steps, an algorithm may be stored on the computer that controls the dispensing of the sanitizer from the dispenser when the biometric sensor senses biometric data matching the partial biometric data of an individual from the group of persons.

The computer may be a rather "primitive" computer that only needs to possess the requisite level of processing power for carrying out the method. This makes it possible for the computer to have as little of an effect as possible on the cost of system 10. The computer may be equipped with or coupled to wireless communication devices so that the computer can be stored away from the hygiene apparatus and wirelessly communicate therewith. In addition, the computer may be configured with any suitable number of expansion and/or communication ports including USB, firewire, etc. ports. Other typical peripherals may be coupled to the computer including a keyboard, mouse, external drive (hard drives, optical drives, flash memory drives, etc.), printer, scanner, facsimile machine, copier, etc.

At least some embodiments of system 10 use standard alternating current (AC) power. Other embodiments, however, may include direct current (DC) either as the primary power source or as a back-up. The DC power may include a variety of different batteries including alkaline cell batteries, nickel metal hydride batteries, lithium batteries, rechargeable batteries, etc. Indeed system 10 may include a recharging system including, for example, a solar recharging system. A wide variety of alternative powering systems are contemplated that would be familiar to those with ordinary skill in the art.

In addition to storing the database and/or the algorithm, the computer may also include a software log stored on the computer that includes a record of the sensing of biometric data by the biometric sensor that matches the partial biometric data stored in the database, the time and date on which the biometric data was sensed that matched the partial biometric data stored in the database, the dispensing of sanitizer, the time and date on which the sanitizer was dispensed, combinations thereof, or any other suitable data. The computer may also include an input/output interface that allows, for example, a user to print out the record.

As suggested above, the biometric sensor may include a fingerprint reader. In some embodiments, the fingerprint reader includes a scanning member onto which the user places one or more fingers. The scanning member then reads the fingerprint of the individual. Alternatively, a “touchless” scanning member may be utilized that scans the fingerprint of an individual without the individual touching the fingerprint reader/member. In these embodiments, system 10 may be a “hands-free” system where the user does not need to touch any part of the system 10 in order to complete the method. The hand hygiene dispenser may include a detector or sensor for determining when one or more hands of an individual within the group are positioned adjacent the hand hygiene dispenser. This may include, for example, an infrared detector. A water dispenser may also be included that may be disposed adjacent the hand hygiene dispenser. Of course, this component may be optional, particularly if a waterless hand sanitizer is utilized. The water dispenser may also include a detector for determining when one or more hands of an individual within the group are positioned adjacent the water dispenser. This may include, for example, an infrared detector similar to the one that may be used with the dispenser.

The hand soap or hand sanitizer itself may also vary considerably. For the purposes of this disclosure, the terms hand sanitizer, hand cleaner, hand soap, antimicrobial soap, etc. all refer to substances that can be used with system 10 to achieve the desired hand hygiene result. Some of these substances may have different properties including properties that might be useful for a particular protocol. The sanitizer may be provided in a number of different forms such as an aqueous solution, a foam, a spray, a gel, etc. In at least some embodiments, a dye indicator may be included with the hand sanitizer that signifies completion of hand washing, for example, by changing color.

The methods for delivering the hand soap or hand sanitizer can also vary. In at least some embodiments, the hand sanitizer dispenser is automated so that a set amount of sanitizer is delivered at the appropriate time followed, as necessary, by an appropriate amount of water. The sanitizer may be gravity fed or dispensed through a pressurized or forced delivery system. An automated dryer may also be included that helps dry the hands of the individual following the completion of the washing cycle.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A method for monitoring hand hygiene and for dispensing hand soap or hand sanitizers, comprising the steps of:
- collecting a set of partial biometric data from a group of persons, the set of partial biometric data being sufficient to distinguish each individual within the group of persons but being substantially insufficient to distinguish a pool of people outside of the group of persons;
- sensing biometric data from a first individual from the group of persons with a biometric sensing apparatus coupled to a hand hygiene dispenser;
- identifying the first individual by comparing the sensed biometric data from the first individual with the set of partial biometric data; and
- dispensing a hand soap or hand sanitizer from the hand hygiene dispenser onto the hands of the first individual;
- wherein the step of collecting a set of partial biometric data from a group of persons comprises:
  - creating a database for storing a set of templates;
    - for each individual from the group of persons, performing the steps of, extracting an at least one characteristic data point from the individual;
  - creating a template associating the at least one characteristic data point with the individual;
  - comparing the template to the set of templates in the database;
  - extracting a subsequent characteristic data point from the individual only if the template is not unique to the set of templates;
  - storing the template in the database.

2. The method of claim 1, wherein the step of sensing biometric data from a first individual from the group of persons with the biometric sensing apparatus includes sensing fingerprint data.

3. The method of claim 1, further comprising the step of creating a record of the dispensing step.

4. The method of claim 3, wherein the record includes a record of the date and time for the dispensing step.

5. The method of claim 3, further comprising the step of creating one or more additional records of additional dispensing steps.

6. The method of claim 5, further comprising the step of compiling a log listing all of the records.

* * * * *